United States Patent [19]

Jalava

[11] Patent Number: 4,713,495
[45] Date of Patent: Dec. 15, 1987

[54] DEVICE FOR SENDING AND RECEIVING A MESSAGE

[75] Inventor: Antti Jalava, Paippinen, Finland

[73] Assignee: Näkövammaisten Keskusliitto ry, Helsinki, Finland

[21] Appl. No.: 19,794

[22] PCT Filed: Apr. 30, 1986

[86] PCT No.: PCT/FI86/00042

§ 371 Date: Jan. 2, 1987

§ 102(e) Date: Jan. 2, 1987

[87] PCT Pub. No.: WO86/06530

PCT Pub. Date: Nov. 6, 1986

[30] Foreign Application Priority Data

May 2, 1985 [FI] Finland .................................. 851745

[51] Int. Cl.⁴ ............................................. H04L 15/00
[52] U.S. Cl. ..................................... 178/2 R; 434/114; 400/87
[58] Field of Search ............ 178/3, 17 R, 17 A, 17 C, 178/2 R, 2 C; 434/113, 112, 114, 116; 400/87, 77, 122; 379/52

[56] References Cited

U.S. PATENT DOCUMENTS 2,972,140 2/1961 Hirsch .................................. 434/113
3,417,202 12/1968 Kolpek .................................. 400/77
4,507,088 3/1985 Wilson .................................. 434/112

*Primary Examiner*—Stafford D. Schreyer
*Attorney, Agent, or Firm*—Burns, Doane, Swecker & Mathis

[57] ABSTRACT

The invention concerns device for transmitting and receiving a message by means of the tactile sensation. By means of keys (2), a code corresponding to one character is formed at a time, which code is converted by the device into an electric signal. The electric signals can be stored in a tape recorder (15), transmitted via a modem (6) into the telecommunication network, or be converted by means of a typewriter (4) into inkprint. Correspondingly, electric signals coming from these peripheral devices can be coded as a mark on feeling keys (3). The device is above all intended as means of conversation and study for deaf-blind persons.

8 Claims, 1 Drawing Figure

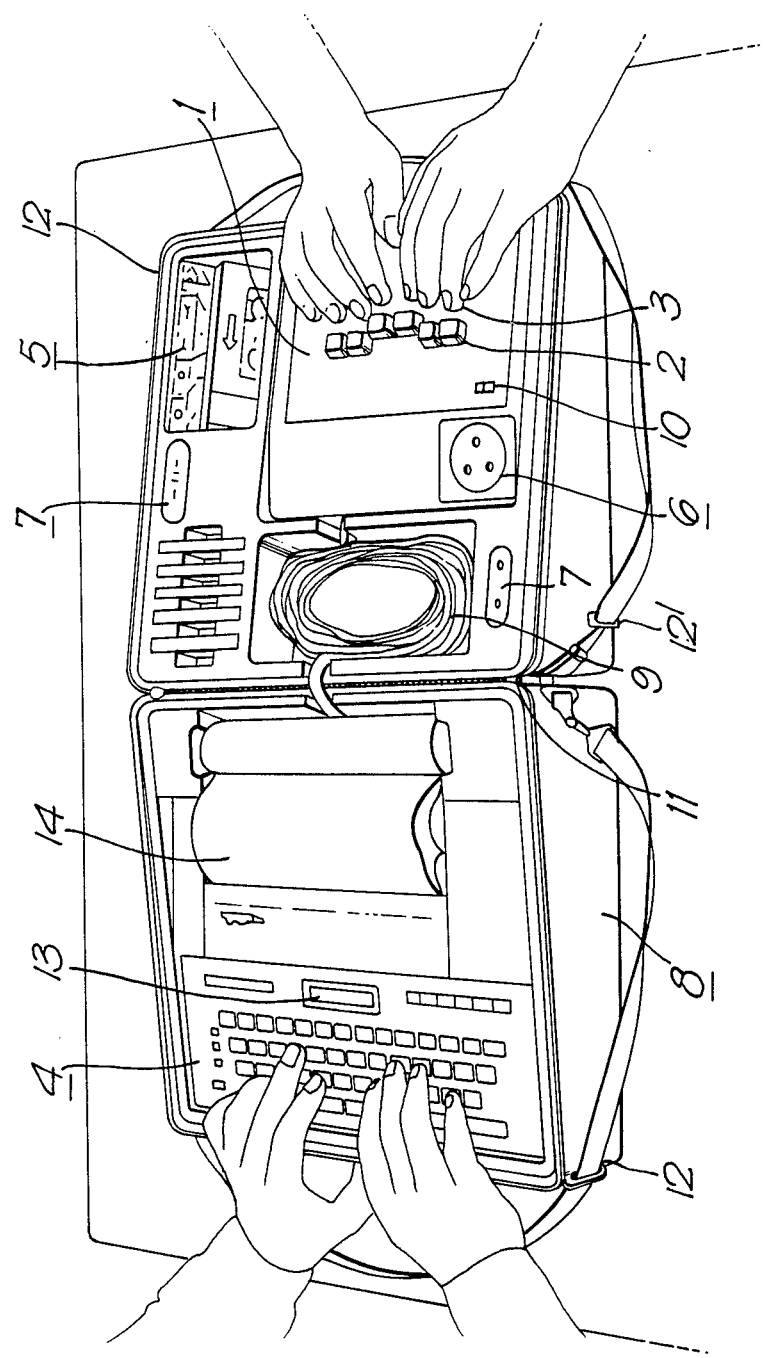

DEVICE FOR SENDING AND RECEIVING A MESSAGE

The invention concerns a device by means of which it is possible to receive and to transmit a message with the aid of the tactile sensation. The apparatus is intended in particular as means of communication for persons with sensory handicaps, such as deaf-blind.

The senses of sight and hearing are man's by far most important means of obtaining and transmitting information. Deaf-blind persons, however, lack both of these senses. Thus, their possibilities to communicate with other persons have been highly limited.

The Finnish Pat. No. 64,475 describes an apparatus supposed to facilitate communication by deaf-blind. The apparatus has six feeling buttons, each of which corresponds to one point of the braille character, as well as six keys, by means of which it is correspondingly possible to form a linear braille character. When two such apparatuses are connected together, two persons who know the linear braille can transmit and receive messages alternatingly.

The operation of the said apparatus is, however, highly restricted, because by its means a deaf-blind person can communicate only with a person who knows the linear braille, which person must additionally have a similar apparatus.

The object of the present invention is above all to provide an apparatus which permits communication by the deaf-blind with other people better than in prior art.

The apparatus now discovered is provided with a console by means of which it is possible to form a character in accordance with a code, e.g. the braille code, as well as with a number of feeling buttons, by means of which the corresponding character can be reproduced so as to be identified by means of the tactile sensation.

The console as well as the feeling buttons are connected to a control unit. The main function of the control unit is to convert the character formed by means of the console to a coded electric signal as well as, correspondingly, to form a sign for the feeling buttons out of the electric signal fed to the control unit. The control unit is connected with a modem, a printer, and with a recorder.

By means of the modem, the apparatus can be connected to the telecommunication network, e.g. the telephone network. The modem modulates the signals coming from the control unit to the form that can be transmitted in the telecommunicaton network, and correspondingly the other way round.

The printer converts the signals coming from the control unit to readable marks, e.g. to inkprint. Correspondingly, the printer converts the characters fed to the printer to electric signals and transmits them to the control unit.

Signals can also be fed from the control unit to the recorder, which is, e.g., a tape recorder. From the recorder, the signals can be transferred back to the control unit so as to be transmitted further.

The invention and the advantages obtainable by its means will be described in more detail in the following detailed description with reference to the accompanying drawing.

The sole FIGURE is a perspective view of the invention.

The most essential unit of the equipment is the "braille console" 1. The braille console has two keyboards; a transmission keyboard 2 and a receiving keyboard 3, each of the said keyboards comprising six keys, each key corresponding to one of the six points in a braille sign. When desiring to transmit a certain character the operator of the braille console depresses the transmission keys corresponding to the character. The braille console further includes a control unit, which converts the sign formed to an electric signal for further transmission, and correspondingly the control unit converts an arriving signal to a braille code on the keyboard of feeling buttons. Each of the keys on the feeling keyboard is provided with a pin, which, in its mark position, rises up from the level of the key.

The transmission keyboard is such that the character is not transferred into the control unit until after all of the depressed keys rise up. The character that has been tapped can also be be checked by means of the feeling pins. In this way it is easy to correct an incorrect combination. Moreover, in this way it is possible to compile a sign out of several subsequent depressions, in which case even those persons who lack some fingers can transmit message. This is important, for, e.g., people who have lost their sight in explosion accidents frequently also have suffered finger damages.

The equipment further includes a typewriter 4, a tape recorder 5, a moden 6 for connection to the telecommunication network, as well as rechargeable batteries 7. The components are integrated in a carrying bag 8.

The typewriter connected to the control unit is capable of receiving the signal coming from the control unit and writing the corresponding mark in normal visible text. Correspondingly, the typewriter can code a character typed on it into an electric signal to be transmitted to the control unit.

By means of the tape recorder connected to the control unit, it is possible to store the message transmitted or received by means of the braille console. From the tape recorder, they can be re-transmitted or read.

The apparatus includes a built-in modem connected to the control unit. In this way, the apparatus can be connected to the telephone network and message be transmitted and received that way. The receiver or sender of the message must also have a compatible modem as well as a printer transmitting the coded message, for example a second set of equipment in accordance with the invention. the connecting of the equipment to the telephone network is simple: the telephone is connected to the connecting socket of the modem in the apparatus, and the cable 9 is connected to the wall socket of the telephone network. Thus, no separate lead-in box is needed in the wall.

In relation to the telephone connection, the apparatus further includes a feeling button 10. To this button, the mark sounds of the telephone line, such as the alarm signals and the engaged signals, are passed in the form of oscillations so as to be felt by the operator of the braille console.

Moreover, the equipment includes an ultrasonic tranmitter related to the telephone line, which said ultrasonic transmitter makes the normal alarm sound of the telphone ultrasonic. The owner of the equipment has a receiver placed on the skin, e.g. on the wrist, which converts the ultrasonic signal to oscillations felt on the skin. In this way, it has been made possible to reach contact on the telephone also with a deaf-blind person. By means of the ultrasonic transmitter and receiver, it is also possible to transmit the line signals of the telephone, which makes it easier for the owner of the apparatus to take contact on the telephone.

The control unit of the apparatus consists of a microprocessor and of a related buffer memory. If necessary, the buffer memory can be used to control the rate of receiving the message to a level suitable for the operator. The buffer may also be used for scanning an arriving or written text letter by letter, word by word, or one sentence of praagraph at a time. Into the buffer, it is possible to collect documentaion and to send it further as packages.

The equipment operates by means of its own rechargeable batteries, which are charged via the terminal 7. The apparatus may also be connected to the electricity supply network by the intermediate of a battery elimanator.

The equipment is placed in an openable carrying bag 8 so that one half contains the typewriter and the other half the braille telephone and the tape recorder. The bag is closed by means of an open end zipper 11, becuase of which the typewriter half of the bag can be opened, seen from the oeprator of the braille telephone, either opposite him or to either side. The halves of the zipper may also be separated from each other, in which case the bag halves are interconnected by means of a connecting cable. The carrying belts 12,12' of the bag have two fastening positions, which permit carrying of the bag either on the shoulder or by hand.

It is an important property of the equipment that by its means a deaf-blind person can have a direct discussion connection with another person. In this way, the shades of meaning, which are so important for a discussion and which express feelings, are also transferred better.

By means of the equipment, a deaf-blind person can have a discussion with another person. Such a discussion can be run, e.g., in different service institutions, stores, pharmacies, with a physician, or as a "chat" between two people at home, in a car, bus, train, or on a bench in a park.

For a discussion, e.g., on a store desk, the bag is placed standing and its zipper is opened evenly from both sides sufficiently far to the "bottom line". The apparatus is opened cautiously by lowering both halves at the same time. The typewriter is placed towards the discussion companion. The deaf-blind operator makes the equipment ready for operation. The current for the typewriter is switched on from the left side of the apparatus, viewed from the direction of the deaf-blind person, on the corner of the apparatus placed next to the deaf-blind person. The apparatus has been pre-set so that now only the "cont" knob has to be depressed. The text "off line" shown on the display window of the printer disappears. The typewriter is now ready for operation. The operator makes the braille console ready for operation by means of the switch. The braille consolve is now ready for operation, and the connection to the printer is switched on.

The equipment is accompanied by a demonstration tape 12, which contains a brief description as well as instructions for the use of the apparatus for the discussion companion. If necessary, the deaf-blind first runs the demonstration text into the printer. Alternatively, the demonstration text may be stored ready in the memory of the control unit.

The deaf-blind person writes his question by means of the transmission keys 2 of the braille console. The text is produced on the display screen 13 of the printer as a current text. As a confirmation of the matter, the text is also produced on the paper 14 by the printer.

After the asking person has completed his question, the replying person first depresses the line-feeder key. The the replying person writes his message calmly sign by sign. The deaf-blind person receives the message by means of the feeling keys 3.

If necessary, the discussion may also be recorded on tape. In the tape recording, both the text of the asking person and the text of the replying person are recorded.

Upon completion of the discussion, the owner of the apparatus switches off the apparatuses: the printer, the tape recorder if used, and the braille console.

Both the printer and the braille console may be made such that they are switched off automatically.

If the persons participating in the discussion sit side by side, the bag is opened so that the zipper remains unopened either at the left side or at the right side of the bag.

The equipment also operates as an auxiliary apparatus for a telephone, as a telecommunication apparatus. For telephone connection, the plug of the telephone is removed from the wall socket. The telephone socket provided on the cable 9 of the apparatus is plugged into the wall socket. the telephone is now plugged into the socket 6 on the apparatus. By following the inlet cable of the telephone, it is easy to find the wall socket of the telephone concerned.

The apparatus may also be made such that is operates without a telephone apparatus. The selecting of the number may be arranged so as to take place by means of the transmission keys. The apparatus may also be made such that it receives messages automatically, or a complete automatic telephone responder into which a message can be stored for a possible caller.

As a single user, a deaf-blind person may use the device for learning how to write and for training in reading. In such a case, the tape recorder is used together with the braille telephone. For this purpose, a particular ABC-cassette may be provided. When learning the alphabet, it is useful to have some sort of an instruction book in which the letters are embossed. If the person who obtains training has some residual hearing, it is possible to use synthetic speech as an aid. A speech synthesizer repeats the letters spoken when they appear in the display of the braille telephone.

Learning how to read is an extension for the learning of the alphabet. Thereat, complete words and clauses are learnt. The vocabulary of a deaf-blind person may be very scarce, so that joint teaching of words and notions is necessary at the beginning.

The tape recorder or the buffer memory may also be used so that a text is written by means of the braille telephone, which text is then stored. The stored text is then read further at the desired speed by means of the braille telephone, and in this way it is possible to examine the correct spelling and, at the same time, to get training in reading.

After the operator of the apparatus has learnt a sufficiently large vocabulary, it is possible to start improving the speed of reading. For that purpose, texts are prepared that have been recorded on the tape at different speeds. The speeds are classified, and in the training the person becomes a faster reader class by class.

The equipment in accordance with the invention also gives the deaf-blind the possibility to read magazines and books. At present, viz., texts to be printed are usually converted to the digital form to be set up. Such a text, e.g. ASCII-coded, could be read directly by a deaf-blind person by means of the equipment now invented. The text can be run as a data set in the buffer memory or on a tape.

The equipment in accordance with the invention can be constructed easily out of components in themselves known. When as many ready commercially available components are used as possible, the cost of the apparatus will also become reasonable.

The apparatus may also be modified further from what has been described herein.

Thus, the printer may be, e.g., a text telephone provided with a display terminal or even a Morse printer. In principle, the printer may also be a combination of a speech synthesizer-recognizer. An optical reader can also be connected to the equipment readily.

The braille console may have various auxiliary keys. Of course, it is also possible to use some other code except the normal six-point braille code. The equipment has, for example, 4 to 9 keys.

If the apparatus does not have to be carried along, a connection to the electricity supply network may be used as the source of current.

The microprocessor may be provided, e.g., with an interpretation program, by means of which it is possible to use the apparatus free of errors with any modification of the braille system whatsoever.

In stead of a taper recorder, the apparatus may, of course, be provided with some other external memory device.

In stead of a mechanical impulse, the feeling pins may be based, e.g., on electric or thermal impulses.

The feeling pins may also be combined with the transmission keys, whereby an even more direct contact of discussion is obtained. The operation of the alarm device of the telephone may again also be based, e.g., on radio or infrared radiation.

The device may be provided with a time device connected to the alarm device, in which case it may be used, e.g., as a clock giving a signal at specified times, as an alarm clock, or as a calendar.

What is claimed is:

1. Device for transmitting and receiving a message with the aid of the tactile sensation, characterized in that the equipment comprises, integrated in a box,
    a console (1), which comprises several character keys (2), which can be placed in the mark position separately, as well as a corresponding number of feeling buttons (3), which can be placed in the mark position separately,
    a control unit (6), by means of which a sign consisting of the keys placed in the mark position can be coded into an electric signal, as well as a coded electric signal be converted to a sign consisting of the mark positions of the feeling buttons,
    a printer (4) connected to the control unit, by means of which printer a coded electric signal can be converted to an inkprint character, and an inkprint character be correspondingly converted to a coded signal,
    a modem (6) connected to the control unit, by means of which said modem a coded electric signal can be modulated to a tele signal and be fed into the telecommunication network as well as a tele signal be recieved from the telecommunication network and be demodulated to a coded electric signal,
    a recorder (5) connected to the control unit, in which a coded electric signal can be stored and out of which the said signal can be run back into the control unit,
    a connecting device, by means of which the modem can be connected to a data communication network, and
    a current source.

2. Equipment as claimed in claim 1, characterized in that the printer (4) connected to the modem is a typewriter.

3. Equipment as claimed in claim 2, characterized in that the typewriter (4) and the character console (1) are placed in different halves of an openable bag (8) and that the bag is closed at the side by means of open end zipper (11), which permits opening of the bag to the rear, to the right and to the left.

4. Equipment as claimed in claim 1, characterized in that the connecting device consists of a contact socket for connecting a telephone to the modem (6) and of a contact plug with cable (9) for connecting the modem to the telephone network.

5. Equipment as claimed in claim 4, characterized in that the equipment includes a feeling button (10) connected to the telephone line, which said button pulsates in accordance with the signal sounds of the telephone.

6. Equipment as claimed in claim 4, characterized in that the equipment further includes a receiver of the alarm sound of the telephone, to be placed on the operator's skin, by means of which said receiver the alarm sound of the telephone can be converted to an impulse detectable by the sense of touch.

7. Equipment as claimed in claim 6, characterized in that the the equipment includes a transformer, by means of which the alarm sound can be converted to a form that can be transmitted by the receiver more readily.

8. Equipment as claimed in claim 7, characterized in that the transformer converts the alarm sound of the telephone into an ultrasonic signal.

* * * * *